C. M. MANLY.
MOTOR VEHICLE.
APPLICATION FILED FEB. 4, 1911.

1,176,307.

Patented Mar. 21, 1916.
3 SHEETS—SHEET 1.

Attest:

Inventor:

C. M. MANLY.
MOTOR VEHICLE.
APPLICATION FILED FEB. 4, 1911.

1,176,307.

Patented Mar. 21, 1916.
3 SHEETS—SHEET 2.

Attest:
E. J. Keeney
Ada I. Miller

Inventor:
Charles M. Manly

C. M. MANLY.
MOTOR VEHICLE.
APPLICATION FILED FEB. 4, 1911.

1,176,307.

Patented Mar. 21, 1916.
3 SHEETS—SHEET 3.

Attest:
E. J. Feeney
Ada I. Miller

Inventor:
Charles M. Manly

UNITED STATES PATENT OFFICE.

CHARLES M. MANLY, OF BROOKLYN, NEW YORK.

MOTOR-VEHICLE.

1,176,307.     Specification of Letters Patent.     Patented Mar. 21, 1916.

Application filed February 4, 1911. Serial No. 606,614.

*To all whom it may concern:*

Be it known that I, CHARLES M. MANLY, a citizen of the United States, residing at No. 113 Montague street, Brooklyn, in the county of Kings and State of New York, have invented a new and useful Motor-Vehicle, of which the following is a specification.

My invention relates to motor vehicles and more particularly to means for controlling the driving wheels thereof.

The object of my invention is to provide means for permitting the driving wheels of such vehicles to differentiate in speed in accordance with the relative paths of travel over which the said wheels are caused to move by the steering mechanism of the vehicle and to prevent them from differentiating to a greater extent.

With this and other objects in view my invention consists in the novel construction and arrangement of parts as hereinafter described and more particularly pointed out in the claims.

I have shown in the accompanying drawings a motor vehicle in which the power is transmitted from the power generator to the driving wheels through a fluid operated variable speed gear comprising a pump and two motors, the pump being a pump for a double circuit of the type shown and described in my application, Serial No. 606,618 filed on the same date as this application.

Figure 1:
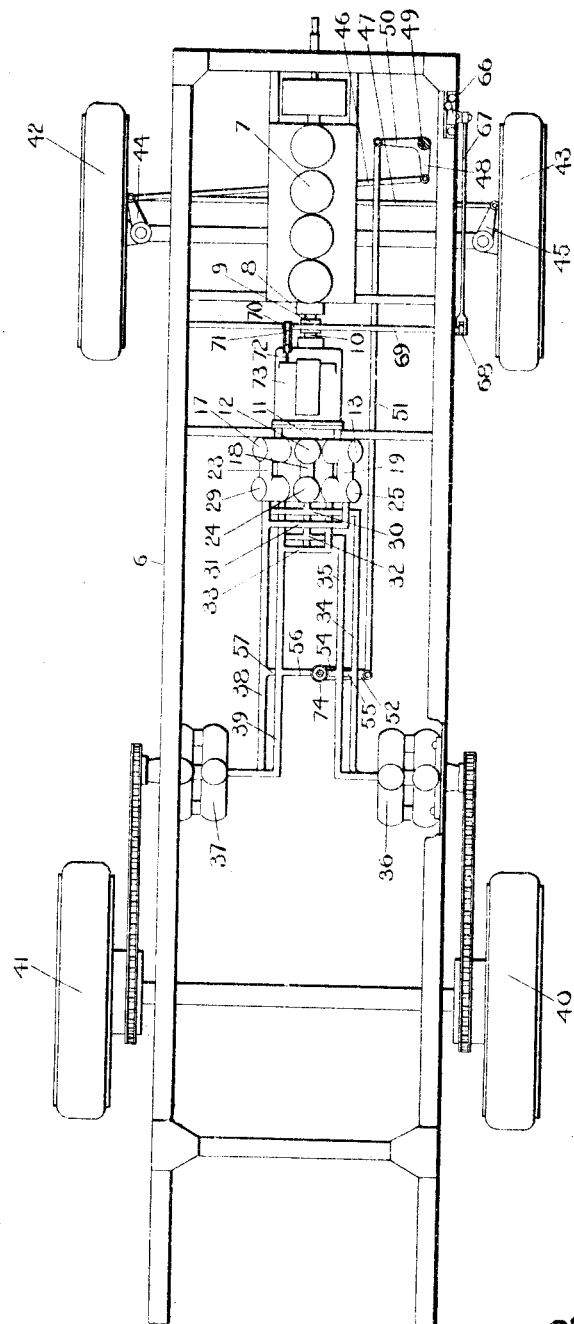
Figure 2:
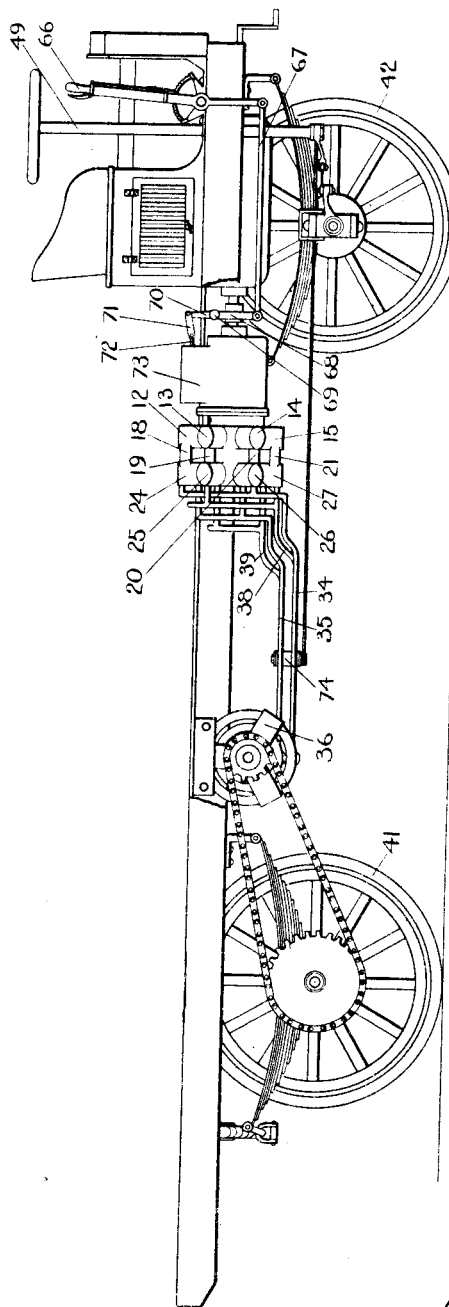
Figure 5:
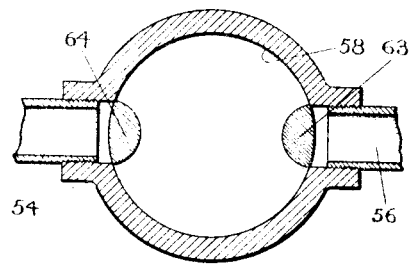
Figure 4:
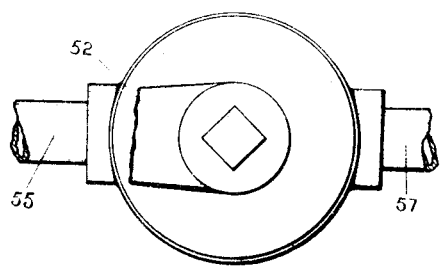
Figure 3:
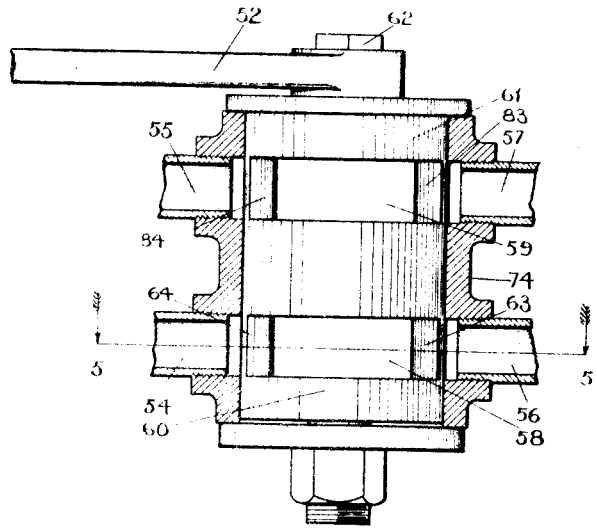

In the drawings which show one form in which my invention may be carried out, Figure 1 is a top plan view of the chassis of the vehicle. Fig. 2 is a side elevation of the same with certain portions broken away to show more clearly other parts, and with the operator's seat added to bring out clearly the general disposition of the mechanism. Fig. 3 is a partial sectional elevation of the differential control valve, shown inverted. Fig. 4 is an inverted plan view of the same, and Fig. 5 is a section on the line 5—5 of Fig. 3.

Referring now to the drawings, in which the same reference characters relate to the same or corresponding parts in all of the figures, the numeral 6 indicates the main frame of the vehicle on which is mounted the power generator or engine 7, the engine shaft 8 being directly connected by the coupling 9 to the driving shaft 10 of the pump 11. The pump 11, which is of a unique type, has been described in detail in my application above referred to, so I will only give such a brief description of it here as is necessary to a proper understanding of its use in the mechanism.

The pump 11 comprises six cylinders radiating equidistantly from a common center, five of the cylinders 12, 13, 14, 15 and 17 respectively being shown, while the sixth cylinder is not shown, the said cylinders being connected by suitable pipes 18, 19, 20, 21 and 23, respectively, with the valve chambers 24, 25, 26, 27 and 29 respectively, while the cylinder not shown is connected by a similar pipe to its valve chamber not shown.

The mechanism of the pump as disclosed in my application above referred to comprises a piston for each of the six cylinders which pistons coöperate with a single common crank pin. The flow of fluid to and from each cylinder is controlled by an individual reciprocating valve which valves are also operated by a common crank pin. The pump is provided with mechanism for varying the eccentricity of the crank pin of the pistons which mechanism is controlled by reciprocating a rod shown at 72 in the drawings of this application. This rod is operated by means of a lever 66 connected by the link 67 to the lever 68 formed on the rod 69 which is journaled on the main frame 6. The rod 69 is provided with a lever 70 connected by means of links 71 to the rod 72. As explained in my application referred to above the mechanism operated by the rod 72 operates to simultaneously vary the volume of fluid drawn into and forced out of each cylinder, from a maximum to zero, and also to reverse the direction of flow of the fluid. Each cylinder with its valve chamber and coöperating parts constitutes a pump having a suction side and a pressure side to its fluid circuit. Instead, however, of joining all the pressure and suction passages of the individual cylinders into common pressure and suction passages respectively, as has been the custom heretofore, I connect the individual passages, in the manner shown in my above mentioned application, into groups, here shown as two groups, thereby providing two separate and distinct pressure passages, and two separate suction passages. To secure a more uniform fluid delivery from the two pressure passages of the pump, I connect by means of the manifold 31 the pressure sides of the fluid circuit of each alternate cylinder, 13, 15 and 17 respectively, together into one main pressure passage, and by the manifold 30 the pressure sides of the intervening cylinders, 12, 14 and the one not shown, into a second main pressure passage. Similarly by the manifold 33 the suction passage of each alternate cylinder 13, 15 and 17 is connected into one suction passage, and by the manifold 32 the intervening cylinders 12, 14 and the one not shown, are connected into a second suction passage. I have here described the manifolds 30 and 31 as forming the pressure passages of the two groups of cylinders and the manifolds 32 and 33 as forming the suction passages, but it is, of course, understood that when the direction of flow of the fluid is reversed by the operation of the rod 72 the manifolds 32 and 33 become the pressure passages and the manifolds 30 and 31 become the suction passages. The manifolds 30 and 32 are connected by their respective pipes 34 and 35 to the motor 36, and the manifolds 31 and 33 are connected by their respective pipes 38 and 39 to the motor 37, each of the motors 36 and 37 being thus provided with an independent source of fluid pressure supply and exhaust, and while the volume of fluid circulated to and from each motor may be varied by varying the capacity of the pump cylinders, yet any variation in the volume of fluid circulated by the group of pump cylinders supplying one of the motors must be accompanied by a corresponding variation in the volume of fluid supplied by the other group of pump cylinders to the other motor. The motor 36 is connected by sprockets and chain to the driving wheel 40 and the motor 37 is similarly connected to the driving wheel 41.

As thus described, both driving wheels will be driven at exactly the same speed, and the vehicle can move only in a straight path unless one of the driving wheels is made to slip on the road. The driving wheels therefore resist any tendency of the vehicle to move in any other than a straight path, and also the loss of tractive grip on the road surface of one of the driving wheels in no way affects the relative speed of the two said wheels. However, while the above first result thus obtained is advantageous when a motor vehicle is being driven in a straight path and the second result is of great importance in enabling a motor vehicle to propel itself where the roads are either slippery, or where one driving wheel meets obstructions not met by the other one, still in steering the vehicle in any path other than one exactly straight, one or the other driving wheel must be able to move faster than its mate. In order to enable this improved driving mechanism to meet this condition, and at the same time while meeting it also preserve the valuable property of causing the said driving wheels to be each independent of any slippage of the other, I provide means, which I will now describe, for causing the movement of the steering wheels of the vehicle to permit the driving wheels to vary their relative speeds in proportion to the extent demanded by the path over which the vehicle is steered.

The steering wheels 42 and 43 are connected through the well known levers and links 44, 45, 46, 47 and 48 to the steering post 49, whereby any turning movement of the said post 49 produces a corresponding movement of the said wheels 42 and 43. Formed integral with the lever 48, and at right angles thereto, is a lever 50. Connected to the lever 50 is a rod 51, the other end of which is connected to a lever 52. The manifold pipes 35 and 39 are connected to each other by the two pipes 54 and 56 which join together through a chamber 58 in the housing 74 in which is mounted a plug cock 60, shown more clearly in Figs. 3, 4 and 5. Similarly the manifold pipes 34 and 38 are connected together by the pipes 55 and 57 through the chamber 59, in which is mounted a cock 61 formed integral with the cock 60 above described. Formed on the cock 60 is a square stem 62 to which the lever 52, above described, is connected. The integrally formed plug cocks 60 and 61 are provided with lobes 63, 64, and 83, 84 respectively which in the position shown in Figs. 3 and 5 block the passage of fluid through the chambers 58 and 59 respectively, thus preventing any fluid from passing from either of the pump circuits to the motor which is connected to the other pump circuit. Any rotary movement, however, of the cocks 60 and 61 from the position shown permits a proportional amount of fluid to pass from either pump circuit to the circuit of the motor connected to the other pump circuit. The cocks 60 and 61 being connected, as above described, to the steering post and steering wheels, any rotary movement of the said steering post causing the said steering wheels to change the path of travel of the vehicle will cause a corresponding change in the volume of fluid permitted to pass from either pump circuit to the other motor.

The operation of the device is as follows: When the operator desires to cause the vehicle to go straight ahead, he keeps the steering wheels set straight by means of the steering post, and as the passages from the two circuits of the pump are blocked off from each other and both are furnishing equal volumes to the two motors, the two driving wheels are driven at the same speed regardless of the relative resistances which they meet. If the operator desires to cause the vehicle to turn to either side, he moves the steering post accordingly and at the same time that the steering wheels cause the vehicle to turn, the cocks open proportionately and permit the motor which is driving the wheel that needs to go faster than the other to receive a proportionate amount of fluid from the other pump circuit, thus causing the said driving wheel to move proportionately faster.

In driving a vehicle on rough roads, one or the other driving wheel must sometimes go periodically a little faster than its mate, even when the vehicle is steered straight ahead, and when it is desired to permit this the lobes of the cocks may be made either a loose fit on the passages of the chambers, or the lobes may be made a fraction narrower than the said passages, or a small hole may be pierced through each lobe, or any similar means may be employed for permitting a definite volume of fluid to be free to pass from either pump circuit to the other. As such a constant passage would in any case need to be only very minute, it would not appreciably affect the tendency of the driving wheels to drive the vehicle straight ahead when the main passages through the cocks were closed. It would also have no appreciable effect on the ability of either driving wheel to drive the vehicle even when the other driving wheel had no tractive grip.

I am aware that it has been proposed to drive the wheels of a vehicle by separate variable speed gears operated in synchronism with the steering mechanism to positively drive the wheels at different speeds, but such construction is open to the objection that should there be any lost motion in the connections between the speed gears and the steering mechanism or should one wheel be worn more than the other, or encounter rougher ground than the other, the driving mechanism would tend to drive the vehicle in a different path of movement from that for which the steering wheels are set, thereby causing the wheels to slip and wear and putting undue strain on the steering mechanism. These objections are entirely avoided in a vehicle constructed in accordance with my invention for as will be noted, the cock 60 does not in any way affect the normal passage of the fluid to the motors and therefore does not compel more fluid to be delivered to one motor than the other but merely permits the motors to receive fluid in exact proportion to the relative peripheral speeds of their driving wheels within the limit set by the position of the cock 60. Should, however, either wheel lose its tractive grip while turning due to encountering a slippery place or for any other reason, it cannot absorb power from the other wheel beyond the amount permitted by the position of the cock 60.

If desired the pump may have any number of cylinders which may be divided into any number of separate circuits to supply fluid to any number of motors, to drive any number of wheels, for any number of interconnected cocks may be provided to control the interconnection of said circuits.

It is thus seen that in my improved motor vehicle I have provided means for driving the driving wheels thereof at whatever speed their respective paths of travel demand and for preventing them from differentiating in speed to a greater amount than their respective paths of travel demand, and also for enabling any driving wheel to drive the vehicle regardless of the driving effect of the other driving wheels.

It is to be understood that I do not limit myself to the details of construction shown, but that I claim the right broadly to any construction or combination of elements which comes within the terms of the annexed claims.

Claims:—

1. A motor vehicle comprising a frame, supporting wheels therefor, means for changing the positions of certain of the wheels to effect steering and means for driving certain of the wheels comprising a plurality of motors independently connected to different wheels and means for controlling said motors to cause them to maintain equal speeds irrespective of differences in the relative resistances encountered or to permit said motors to freely differentiate in speed within predetermined limits, said controlling means being operatable to vary such limits.

2. A motor vehicle comprising a frame, supporting wheels therefor, steering mechanism for changing the positions of certain of the wheels to effect steering, means for driving certain of said wheels comprising a separate motor for each wheel driven and means operated by the steering mechanism for controlling said motors to allow them to freely differentiate in speed within predetermined limits, said limits being varied by the change in position of the steering wheels, and to an extent proportional to the extent of such change.

3. A motor vehicle comprising a frame, supporting wheels therefor, means for changing the positions of certain of the wheels to effect steering and means for driving certain of the wheels comprising a plurality of motors independently connected to different wheels and means for controlling said motors to cause them to maintain equal speeds irrespective of differences in the relative resistances encountered or to permit said motors to freely differentiate in speed within predetermined limits, said controlling means operating to vary said limits in synchronism with the change in position of the steering wheels.

4. In a motor vehicle, the combination with multiple fluid pressure motors, of a fluid pressure pump supplying fluid pressure to said motors, means for steering the vehicle, and means coacting with said steering means for controlling the relative volumes of fluid supplied to said motors, substantially as described.

5. In a motor vehicle, the combination with multiple fluid pressure motors, of a fluid pressure pump supplying fluid pressure to said motors, means for steering the vehicle, and means operated by said steering means for permitting the relative volumes of fluid supplied to the said motors to vary, to a predetermined extent, substantially as described.

6. In a motor vehicle comprising two driving wheels, the combination with a fluid pressure motor connected to drive each driving wheel, of a power generator, a fluid pressure pump driven by said power generator and supplying fluid pressure to each of said motors, means for steering the vehicle and means coacting with said steering means for controlling the relative volumes of fluid pressure supplied to said motors, substantially as described.

7. In a motor vehicle comprising a plurality of driving wheels, the combination with a plurality of fluid pressure generating elements, a hydraulic motor for driving each of said driving wheels, separate passages directly connecting said generating elements and hydraulic motors, one generating element to each motor respectively, and means interconnecting said passages operatable to maintain said passages disconnected or to permit a portion of the fluid from either generating element to pass to another motor while maintaining said direct passages unobstructed, substantially as described.

8. In a motor vehicle, the combination of steering wheels, steering mechanism therefor, a plurality of driving wheels, a plurality of fluid pressure generating elements, a hydraulic motor for driving each of said driving wheels, separate passages directly connecting said generating elements and hydraulic motors, one generating element to each motor respectively and means interconnecting said passages operatable to maintain said passages disconnected or to permit a portion of the fluid from either generating element to pass to another motor while maintaining said direct passages unobstructed, and means connecting said last named means to said steering mechanism for operation in synchronism therewith, substantially as described.

9. In a motor vehicle, the combination of a prime mover, a double circuit pump driven thereby, driving wheels, a separate hydraulic motor for each driving wheel, fluid transmitting connections between each of the motors and one of the circuits of the pump respectively, steering mechanism and means operated thereby for establishing intercommunication of the said two circuits, substantially as described.

10. In a motor vehicle the combination of a prime mover, a variable capacity double circuit pump driven thereby, driving wheels, a separate hydraulic motor for each driving wheel, fluid transmitting connections between each of the motors and one of the circuits of the pump respectively, steering mechanism and means operated thereby for establishing intercommunication of the said two circuits to a variable extent, determined by the position to which the steering mechanism is moved in steering the vehicle, substantially as described.

11. In a motor vehicle the combination of a pump mechanism comprising two elements having the same capacity, driving wheels on opposite sides of the vehicle, a motor for each of said wheels, connections between said pump elements and said motors, said connections comprising conduits extending from each pump element to one of said motors respectively, and a valve mechanism between said conduits adapted to permit intercommunication between said conduits without restricting the area of either.

CHARLES M. MANLY.

Witnesses:
E. J. FEENEY,
ADA I. MILLER.